US006987753B2

(12) United States Patent
Liu et al.

(10) Patent No.: US 6,987,753 B2
(45) Date of Patent: Jan. 17, 2006

(54) APPARATUS AND METHOD FOR DYNAMIC BANDWIDTH ALLOCATION WITH MINIMUM BANDWIDTH GUARANTEE

(75) Inventors: Bo Liu, Kanata (CA); Bill Mitchell, Arnprior (CA)

(73) Assignee: Alcatel Canada Inc, Kanata (CA)

( * ) Notice: Subject to any disclaimer, the term of this patent is extended or adjusted under 35 U.S.C. 154(b) by 933 days.

(21) Appl. No.: 09/974,318

(22) Filed: Oct. 9, 2001

(65) Prior Publication Data
US 2003/0095562 A1  May 22, 2003

(51) Int. Cl.
H04J 3/16 (2006.01)
(52) U.S. Cl. ..................................... 370/348; 370/468
(58) Field of Classification Search ................ 370/347, 370/348, 468
See application file for complete search history.

(56) References Cited

U.S. PATENT DOCUMENTS

| | | | | |
|---|---|---|---|---|
| 5,384,777 | A * | 1/1995 | Ahmadi et al. | 370/337 |
| 5,446,737 | A * | 8/1995 | Cidon et al. | 370/452 |
| 6,353,618 | B1 * | 3/2002 | Hung et al. | 370/459 |
| 6,801,543 | B1 * | 10/2004 | Ployer | 370/468 |
| 2002/0024971 | A1 * | 2/2002 | Umayabashi | 370/468 |
| 2002/0105970 | A1 * | 8/2002 | Shvodian | 370/468 |
| 2003/0043741 | A1 * | 3/2003 | Mukai et al. | 370/229 |

* cited by examiner

Primary Examiner—Melvin Marcelo

(57) ABSTRACT

In a time division multiplex access asynchronous transfer mode wireless network wherein network interface units (NIUs) are connected to a base transceiver station (BTS) by way of a radio frequency (RF) wireless link comprising time slots which are grouped into frames, there is presently no method or apparatus to allow dynamic bandwidth allocation while maintaining a minimum bandwidth allocation to NIUs. Using a combined Guaranteed Bandwidth Allocation (GBA) scheme with a Dynamic Bandwidth Allocation (DBA) scheme, a configurable number of time slots can be permanently assigned to an NIU using GBA while the NIU can request additional timeslots using DBA. Using a queue occupancy threshold and a queuing delay threshold, the DBA scheme takes into account the GBA time slots which have been allocated, so that time slots are not unnecessarily requested by an NIU. At the BTS level, a time slot manager utilizes a frame look ahead procedure to allocate time slots based on the queue occupancy forwarded from the NIU. Additionally, a configurable parameter is defined which reflects the level of traffic in an NIU, to allow pro rated allocation of time slots.

13 Claims, 4 Drawing Sheets

APPARATUS AND METHOD FOR DYNAMIC BANDWIDTH ALLOCATION WITH MINIMUM BANDWIDTH GUARANTEE

BACKGROUND TO THE INVENTION

1. Field of Invention

This invention relates generally to the field of wireless communication networks and more specifically to a method of dynamically allocating bandwidth within such a network while maintaining a minimum guaranteed bandwidth.

2. Description of the Related Prior Art

FIG. 1 shows a wireless communication system 8 which includes a base transceiver station (BTS) 10 connected to a network 12 which may be, for example, an Asynchronous Transfer Mode (ATM) network. The BTS 10 can be an ATM switch such as the 7470 MSP™ manufactured by Alcatel Networks Corporation, configured with one or more radio interface cards, or the like. Through radio frequency (RF) transmission, BTS 10 communicates with one or more network interface units 14. NIUs 14 in turn, are hard wired using copper wire, fibre optic cable or the like to a plurality of client hardware platforms such as a Private Branch Exchange (PBX) 16, Local Area Network (LAN) 18, a desktop terminal, or similar devices. The system is designed to support all forms of traffic including video, audio and bulk data transmissions.

As indicated above, the base transceiver stations 10 are interlinked to network interface units 14 via RF links. One frequency is used for transmission from the BTS 10 to the NIU 14 (the "downlink" frequency), and a different frequency is used for transmission from the NIU 14 to the BTS 10 (the "uplink" frequency). In a typical configuration, microwave transmissions facilities are used operating in the 20 to 28 gigahertz range. The downlink is usually of a broadcast nature, while the uplink uses a Time Division Multiple Access ("TDMA") technique to allow NIUs 14 to share the frequency allotted. The TDMA technique divides up the total bandwidth into a predetermined number of time slots, which are allocated to NIUs using various schemes which will be discussed below.

In a TDMA wireless system, NIUs are connected to base transceiver stations by way of wireless RF links. A diagram depicting the system architecture of this arrangement is shown at FIG. 2 where an ATM system is used as an example and AAL1=ATM Adaptation Layer Type 1, AAL5=ATM Adaptation Layer Type 5, and CE=Circuit Emulation. In this example, traffic arriving from the Ethernet port and CE port is segmented into ATM cells using AAL5 and AAL1 respectively. The arriving traffic streams are then mapped onto ATM virtual channels (VC). The ATM cells are queued per service category and or per VC, and served by the scheduler. The data transmitted from NIUs to the BTS over the wireless link is formatted in accordance with TDM formatting. The uplink consists of time slots which are grouped into frames. Each NIU transmitting data via the connection monitors the system timing and transmits data in the time slots allocated to it. Each frame contains 133 time slots and each frame is 5.625 ms in duration. Each time slot can be independently assigned to an NIU and can be used to send a single ATM cell. Each time slot falls into one of the following categories: polling slot (P); contention slot (C); guard slot (G); and reservation slot. Reservation slots are further divided into dynamic bandwidth allocation (DBA) and guaranteed bandwidth allocation (GBA). In the downstream direction, information is broadcast to the NIUs. The downlink consists of MPEG packets, two such packets comprising a total of seven ATM cells. The first packet in each frame is considered the frame start packet and is used by the Medium Access Control (MAC) layer to provide information to the NIUs. The speed of the downlink is approximately 41 Mbps (ATM layer). The speed of the TDMA uplink is approximately 10 Mbps (ATM layer). Both the uplink and the downlink frames have the same duration, and they are synchronized with their frame starts offset typically by ½ frame (See FIG. 3).

A radio link can support one or more virtual connections, such as ATM virtual channel and virtual path communications or IP traffic flows. Referring to the uplink transmission, the time slots may be either permanently assigned to a connection for the duration of the connection or dynamically assigned to a connection on demand. As discussed above, the former is referred to as guaranteed bandwidth allocation (GBA) and the latter as dynamic bandwidth allocation (DBA).

In the GBA mode, when the connections are created, a number of dedicated time slots are assigned to individual NIU's based on the traffic parameters of the connections. The time slots which are dedicated to a NIU are always accessible to the NIU and cannot be shared by other NIUs even when those time slots are idle. Therefore, the subscribed bandwidth is guaranteed. A algorithm or rule is usually used to select the time slots. For example, the algorithm disclosed in U.S. patent application Ser. No. 09/244,165 entitled "Method And Apparatus For Controlling Traffic Flows In A Packet-Switched Network", filed on Feb. 4, 1999 may be used to select the time slots which minimize the jitter.

In the DBA mode, time slots are not dedicated to any NIU. Instead, a pool of time slots are shared among multiple NIUs. If a NIU has data to send, i.e., there are cells/packets in its queue, the NIU sends data through the assigned time slots. In the current methodology, there is a single data queue in the NIU. The queue is checked at the beginning of every 5.625 ms frame. If the queue is not empty and no request or grant is in progress, the NIU sends a bandwidth request to the BTS through a contention slot. The request contains the queue occupancy information, e.g., in terms of cells or bytes. A random access algorithm, namely Ternary Tree Splitting with Free Access which is well known in the art, is used in determining the contention slot in which the request is to be sent. At the BTS, a time slot allocation algorithm, for example the one proposed in U.S. patent application Ser. No. 09/316,439 entitled "Method And Apparatus For Assigning Time Slots Within A TDMA Transmission", filed on May 21, 1999, is used to allocate time slots. The NIU sends the cells/packets through the assigned time slots. Partial grant is allowed and subsequent requests can be made to request for more bandwidth.

The advantage of the GBA is that the subscribed bandwidth is always guaranteed. However, GBA is often inefficient in terms of bandwidth utilization when the traffic is bursty, i.e., during the idle period the bandwidth is wasted.

The advantage of DBA is that the bandwidth is allocated on demand. DBA is efficient in terms of bandwidth utilization when the traffic is bursty. However, since the time slots are shared among multiple NIUs and the current DBA algorithm assigned time slots on a "best effort" basis, the required bandwidth may not be guaranteed when multiple NIUs contend for bandwidth.

Given the limitations of GBA and DBA described above, a need exists for a method of allocating bandwidth to an NIU on demand while ensuring that a minimum amount of bandwidth is always available to each NIU.

SUMMARY OF THE INVENTION

In order to overcome the deficiencies of the prior art there is provided a wireless network and a method for operating the network which combines the benefits of GBA with the advantages of DBA. The present invention focuses on the transmission and time slot allocation for the upstream transmission. In the method of the present invention, which is referred to as the "GBA+DBA mode", a number of dedicated time slots are assigned to individual NIUs in the same way as in the GBA mode. Those dedicated time slots represent the guaranteed bandwidth. The remaining time slots are shared among the NIUs and are allocated on demand.

Since traffic is usually bursty, i.e., consists of on and off periods, a NIU may temporarily receive traffic at a higher rate than the guaranteed capacity and the queue in the NIU builds up. If the NIU decides that it needs more bandwidth, it sends a bandwidth request to the BTS through either the GBA time slots (preferred) or contention time slots. In order to ensure that requests are not prematurely initiated, a queue occupancy threshold and a queueing delay threshold are introduced to determine if additional bandwidth is required. That is, if the queue occupancy exceeds a queue occupancy threshold or the queueing delay exceeds a delay threshold, the NIU is considered congested and additional bandwidth is required to alleviate the congestion. Prematurely requesting for bandwidth may cause wasting of bandwidth.

In accordance with one aspect of the present invention there is provided, in a time division multiplex access ("TDMA") wireless network wherein network interface units communicate with a base transceiver station by way of transmission of data in a plurality of time slots grouped into a plurality of frames, said time slots including one or more guaranteed bandwidth allocation ("GBA") time slots assigned to respective network interface units and dynamic bandwidth allocation ("DBA") time slots assignable to any of said network interface units, a method for allocating said DBA time slots to said network interface units comprising the steps of transmitting data from a queue in each of a plurality of said network interface units to said base transceiver station in said one or more GBA time slots assigned to each respective network interface unit, determining a measure of status of the queue in one of said network interface units, transmitting, if said measure of status exceeds a threshold, from said one network interface unit to said base transceiver station a request for allocation of DBA time slots including queue occupancy information, determining at said base transceiver station the availability of DBA time slots, assigning, in response to receipt of said request for allocation, to said one network interface units DBA time slots based on the queue occupancy, transmitting a message from the base transceiver station to said one network interface unit indicating the assigned DBA timeslots, and transmitting queued data from said one network interface unit to said base transceiver station in said assigned GBA and DBA time slots.

In accordance with another aspect of the present invention there is provided, in a time division multiplex access ("TDMA") wireless network wherein network interface units communicate with a base transceiver station by way of transmission of data in a plurality of time slots grouped into a plurality of frames, said time slots including guaranteed bandwidth allocation ("GBA") time slots uniquely assigned to network interface units and dynamic bandwidth allocation ("DBA") time slots variably assignable to said network interface units, a method for allocating said time slots to said network interface units comprising the steps of transmitting from an network interface unit to said base transceiver station a request for allocation of time slots, said request including information regarding queue occupancy, assigning at said base transceiver station to said network interface unit DBA time slots based on queue occupancy, the number of GBA time slots assigned to said network interface unit and the number of unassigned DBA time slots, and transmitting queued data from said network interface unit to said base transceiver station in said assigned GBA and DBA time slots.

BRIEF DESCRIPTION OF THE DRAWINGS

A better understanding of the invention will be obtained by reading the description of the invention below, with reference to the following drawings, in which.

DESCRIPTION OF THE PREFERRED EMBODIMENT

Figure 1:
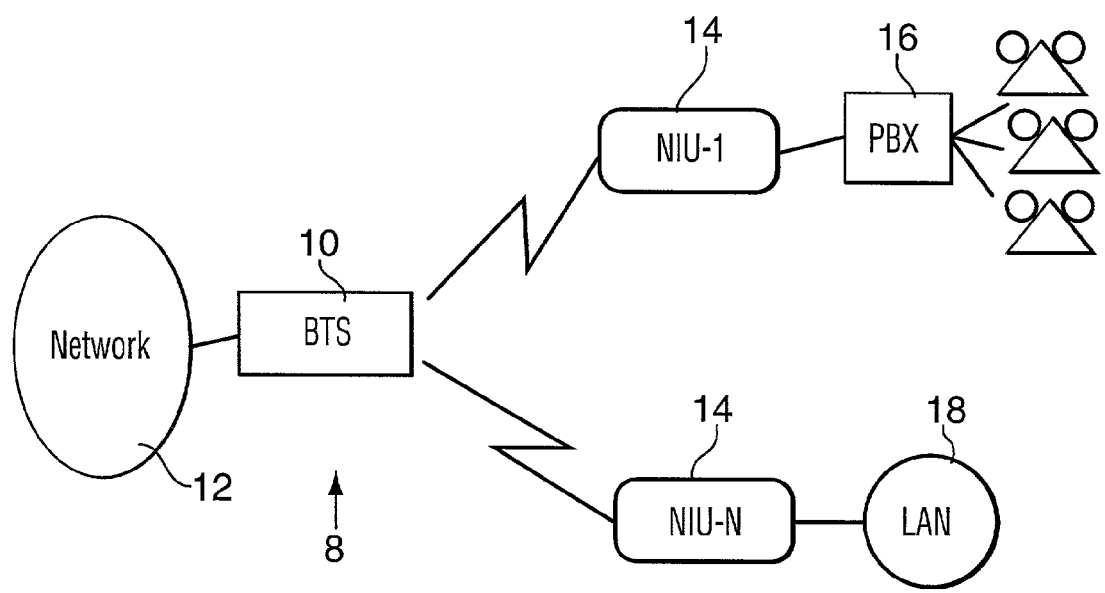
FIG. 1 is a diagrammatic representation of a wireless communications network.
Figure 2:
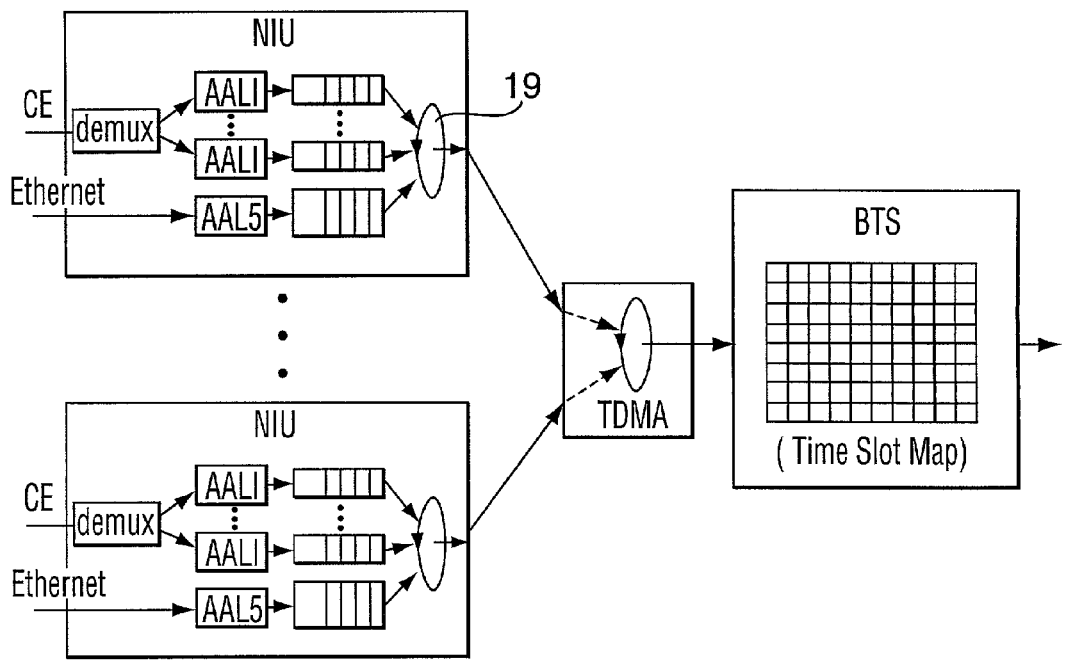
FIG. 2 is diagram depicting the data flow in a wireless ATM network.
Figure 3:
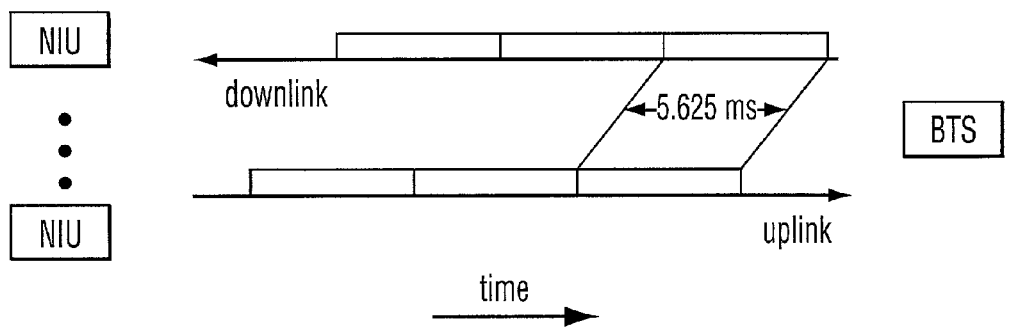
FIG. 3 is an illustration of uplink and downlink frames.

The term "GBA+DBA" refers to the mode in which a number of time slots are permanently assigned to each NIU and the NIU can request additional time slots using the DBA mechanism. The present invention focuses on the uplink transmission and on a "GBA+DBA" technique at the NIU level used in conjunction with an improved timeslot allocation procedure at the BTS level to enhance the overall assignment and utilization of bandwidth between competing NIUs. Referring to FIG. 2, the CE port is serviced using GBA while the ethernet port is serviced using GBA+DBA on a "best effort" basis. One or more virtual connections may be supported by the Ethernet port with single FIFO queue.

Figure 4:
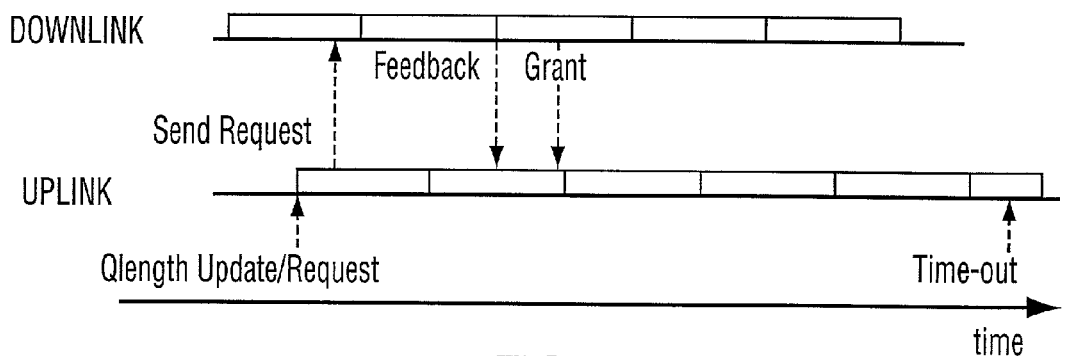
FIG. 4 is a time slot allocation message sequence.

As shown in FIG. 4, in the DBA mode when more bandwidth is required the NIU sends a "Request" to the BTS for a specified number of timeslots, the number being determined by the data queue occupancy which is measured in terms of cells or bytes. The BTS then searches for available timeslots and if found, transmits a "Grant" message back to the NIU. If there are no available time slots, the request is dropped. A new request may be made by the NIU when the current request times out and hence dropped. If time slots are available and a "Grant" is received, the NIU then begins to transmit the queued data.

Currently DBA mode does not take into account GBA time slots. If the data queue in the NIU is not empty and no time slot request or grant is in progress, the NIU will request additional time slots. When the traffic is bursty and the queue may temporarily build up, a request will be generated although the temporary increase in traffic could have been handled using GBA timeslots alone. In such a case, the additional DBA time slots requested are wasted and other NIUs are deprived of these much needed DBA time slots. In short, a non-zero queue occupancy does not necessarily mean that additional bandwidth is required In order to ensure that there is no wasting of bandwidth, the present invention invokes rules to ensure that a request for additional bandwidth is not generated unless absolutely required. A delay threshold and a queue threshold are defined. The delay threshold, $T_{delay}$ is the queuing delay (in seconds) which can be tolerated before the NIU sends a request for additional bandwidth. The queue occupancy threshold, $T_{queue}$ is the queue occupancy level (in terms of cells or bytes) which signals congestion. Both thresholds are configurable parameters. The valid range for the queue occupancy threshold is $0 \leq T_{queue} \leq Q_{size}$ and the valid range for the delay threshold is $$0 \leq T_{delay} \leq \frac{T_{queue} \times \Delta_{FR} \times C}{N_{GBA}}$$

where $Q_{size}$ is the size of the first-in-first-out (FIFO) queue, $N_{GBA}$ is the number of GBA time slots allocated to the NIU and $\Delta_{FR}$ is the duration of the TDMA frame in seconds. C is a conversion factor which is used to convert $T_{queue}$ to number of time slots required.

When a NIU decides to request for additional bandwidth, the NIU sends a bandwidth request to the BTS. The request indicates the current queue occupancy which is converted to the number of time slots required. The BTS manages a time slot map and allocates time slots to the NIU based on its bandwidth requirement taking into account the GBA time slots which are dedicated to the NIU.

Figure 5:
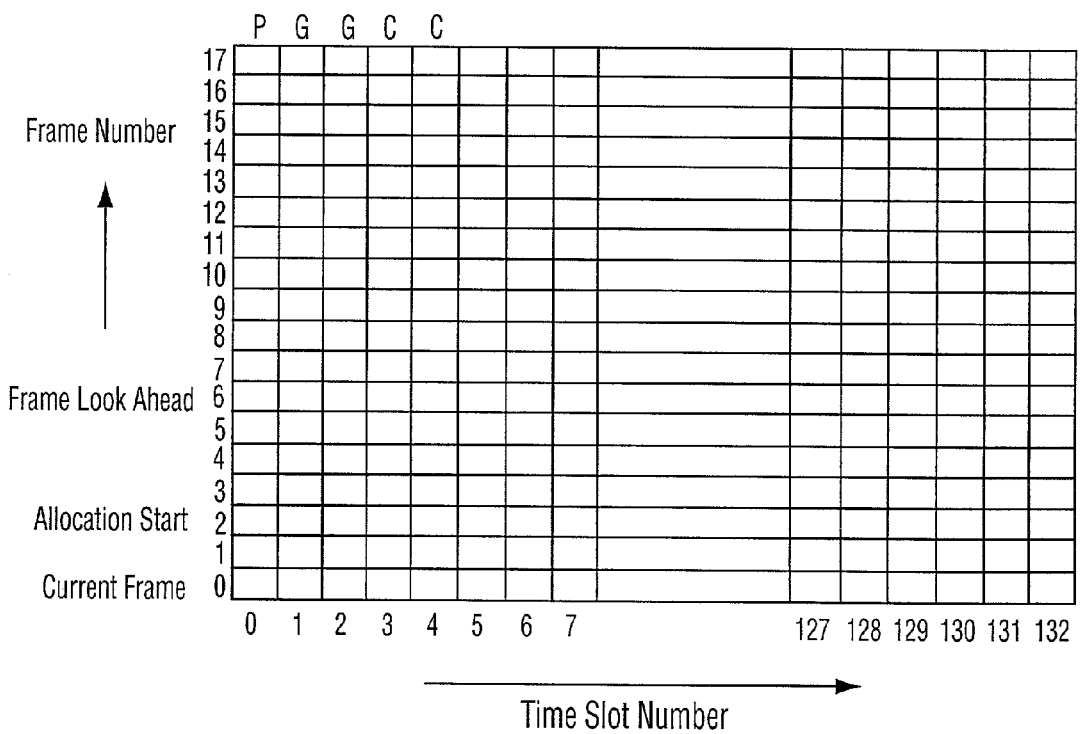
FIG. 5 an uplink timeslot map.

An example of the time slot map which is a 133 by 18 array is shown in FIG. 5. Each row of the map corresponds to a frame and each frame contains 133 time slots. The first row corresponds to the Current Frame (the row that the time slot request is processed) and the third row, which is configurable, is the Allocation Start Frame (the row the time slot allocation starts). The time slot map starts with the current frame and is updated as the next frame becomes current. When the BTS receives a request for additional bandwidth from the NIU, the BTS checks the time slot map, for example in the manner described in U.S. patent application Ser. No. 09/316,439 entitled "Method And Apparatus For Assigning Time Slots Within A TDMA Transmission", filed on May 21, 1999. If there is at least one time slot available within a given number of frames (i.e. the number set in the Frame Look Ahead), the BTS will grant time slots to the NIU. The number set in the Frame Look Ahead relates to the NIU request timeout. If the NIU does not receive grant within the given number of frames, it will send another request. The time slot allocation is made frame by frame until either the end of the map is reached or the number of the time slots requested is satisfied. The time slot allocation takes into account the GBA time slots.

The maximum number of time slots $N_{TS}$ which may be allocated for a single grant is a configurable number, for example 16 (from the Allocation Start Frame). A maximum number of DBA time slots per frame, $N_{max}$ is defined for each NIU. $N_{max}$ is a configurable parameter and is determined based on the peak bandwidth constraint of individual NIUs (e.g. for low bandwidth NIUs (e.g. 75 Kbps) $N_{max}=1$ whereas for a high bandwidth NIU (e.g. 2 Mbps) $N_{max}=32$). The advantages of setting Nmax are as follows:

(a) It allows multiple NIUs to concurrently access the available bandwidth, thereby avoiding all available bandwidth being assigned to a single high-traffic NIU;

(b) The burst size of the traffic can be limited by sending the traffic over multiple frames;

(c) A lower traffic NIU may use a smaller number of time slots per frame but simply take more frames. This tends to reduce the chance of collision while requesting bandwidth and thereby improve throughput; and (d) NIUs with high volume traffic or very bursty traffic can be satisfied by assigning a larger $N_{max}$.

Figure 6:
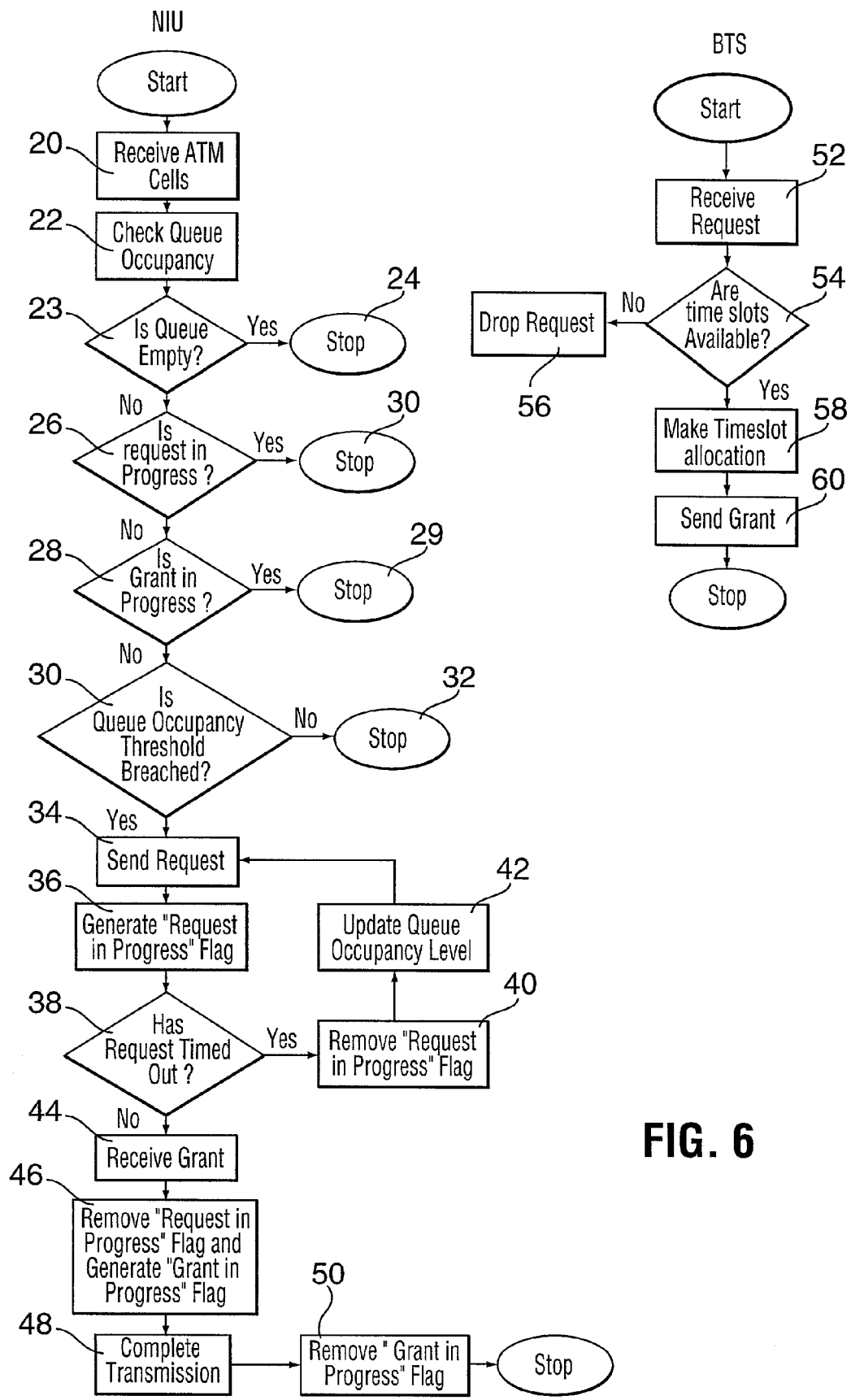
FIG. 6 is a flow chart depicting the sequence of events integral to the method of the present invention.

FIG. 6 depicts the steps which occur at both the NIU and BTS to implement the method of the present invention. With regard to the NIU at step 20 the NIU receives data from a client. At step 22, the queue occupancy is checked. Typically the queue is checked every frame to determine if there is data in the queue. At step 23, if a determination is made that the queue is empty, at step 24 no action is taken. If there is data in the queue then a determination is made at steps 26 and 28, as to whether or not there is a request or a grant in progress. If either one of these criteria is met, no action is taken as shown at steps 30 and 32. If these criteria have been satisfied otherwise, then a determination is made at step 30, as to whether the queue occupancy threshold has been breached $$\left(\text{i.e. if } N_{queue} > \frac{T_{delay} \times N_{GBA}}{\Delta_{FR} \times C}\right),$$

where $N_{queue}$ is the current queue occupancy, and C is the conversion factor defined above. If it is not breach, no action is taken as seen at step 32. If it is breached, then at step 34 a request for time slots is sent to the BTS in a contention slot or GBA slot which includes the current queue occupancy $N_{queue}$. At step 36 a "Request in Progress" flag is generated. If, at step 38, the request is timed out (usually after 5 frames), then the "Request in Progress" flag is deleted at step 40 and the current queue occupancy, $N_{queue}$ is updated at step 42. Another request is then generated at step 34. If the request is not timed out, then a grant is received from the BTS at step 44. At step 46, the "Request in Progress" flag is then removed and a "Grant in Progress" flag is generated. At step 48, the data transmission to empty the queue is performed. Finally, at step 50, the "Grant in Progress" flag is removed after data transmission is complete. The flag is used to block further request when a request or grant is in progress.

The following is an example of the structure of the Request Message which follows the MAC message header:

```
Reservation_request( )
{
    number_time_slots
}
```

Once a request is received by the BTS, processing in the BTS occurs. At step 52, the request is received. At step 54 there is a determination made as to whether or not time slots are available within the frame look ahead. If no time slots are available, at step 56 the request is dropped (and the request is timed out at the NIU invoking steps 40, 42 and 34). If time slots are determined to be available from the Frame Look Ahead then at step 58 time slot allocation occurs in accordance with the following procedure:

```
Set TS_count = 0 and TS_per_frame = 0;
For each frame in the time slot (TS) map starting from the
Allocation Start Frame
```

-continued

```
    Set TS_count = TS_count + N_GBA;
    If (TS_count<N_queue) AND (TS_per_frame<N_max) AND
    (TS_count<N_TS) Then
        Allocate the time slot to the NIU;
        Set TS_count = TS_count + 1;
        Set TS_per_frame = TS_per_frame + 1;
    End if
End for
```

To minimize the overhead of messaging on the downstream channel, the BTS may allocate a number of time slots for the same number of frames. The total time slots granted including the GBA time slots should be equal to or larger than the requested number of time slots. Partial grant is allowed when not enough time slots are available. A subsequent request may be sent for more bandwidth. The following is an example of the structure of the Grant Message which follows the MAC message header:

```
Time_slot_allocaton( )
{
    start_frame_number
    number_frames
    time_slot_list
    {
        time_slot
    }
}
```

Once the allocation is complete, at step 60 the grant is sent to the NIU (and the NIU transmits the queued data to the BTS as shown at step 48).

The advantages of the present invention are now readily apparent. "DBA+GBA" has the advantages of both DBA and GBA i.e. it can guarantee the minimum required bandwidth by using dedicated time slots and, at the same time, allow the traffic to burst above the guaranteed rate by requesting additional bandwidth when it is needed. By relying on $T_{delay}$ and $T_{queue}$ to determine when a request should be sent, additional bandwidth will only be requested when needed. Further, by providing the current occupancy in the request, the BTS is allowed to determine the number of DBA time sots actually required, accounting for the fact that some of the traffic will be handled by the guaranteed bandwidth dedicated to a particular NIU. At the BTS level, by having the ability to set $N_{max}$ based on the traffic level in a particular NIU, time slot allocation can be tailored for high or low bandwidth NIUs.

A person skilled in the art may now conceive of alternate structures and embodiments or variations of the above. All those which fall within the scope of the claims appended hereto are considered to be part of the present invention.

What is claimed is:

1. In a time division multiplex access ("TDMA") wireless network wherein network interface units communicate with a base transceiver station by way of transmission of data in a plurality of time slots grouped into a plurality of frames, said time slots including one or more guaranteed bandwidth allocation ("GBA") time slots assigned to respective network interface units and dynamic bandwidth allocation ("DBA") time slots assignable to any of said network interface units, a method for allocating said DBA time slots to said network interface units comprising the steps of:
   (a) transmitting data from a queue in each of a plurality of said network interface units to said base transceiver station in said one or more GBA time slots assigned to each respective network interface unit;
   (b) determining a measure of status of the queue in one of said plurality of network interface units;
   (c) transmitting, if said measure of status exceeds a threshold, from said one network interface unit to said base transceiver station a request for allocation of DBA time slots including queue occupancy information;
   (d) determining at said base transceiver station the availability of DBA time slots;
   (e) assigning, in response to receipt of said request for allocation, to said one network interface unit DBA time slots based on the queue occupancy;
   (f) transmitting a message from the base transceiver station to said one network interface unit indicating the assigned DBA timeslots; and
   (g) transmitting queued data from said one network interface unit to said base transceiver station in said assigned GBA and DBA time slots.

2. The method according to claim 1 wherein said measure of queue status is based on queue occupancy.

3. The method according to claim 2 wherein the queue is a first-in-first-out (FIFO) queue and said threshold is represented by $T_{queue}$ such that $0 \leq T_{queue} \leq Q_{size}$ where $Q_{size}$ is the size of the queue.

4. The method according to claim 1 wherein said measure of queue status is based on queuing delay.

5. The method according to claim 4 wherein the queue is a first-in-first-out (FIFO) queue and said predetermined threshold is represented by $T_{delay}$ such that $$0 \leq T_{delay} \leq \frac{T_{queue} \times \Delta_{FR} \times C}{N_{GBA}}$$

where $T_{queue}$ is the queue occupancy threshold, $N_{GBA}$ is the number of assigned GBA time slots, $\Delta_{FR}$ is the duration of the frame in seconds and C is a conversion factor.

6. The method according to claim 1 wherein the cumulative number of assigned GBA and DBA time slots is sufficient to accommodate transmission of queued data whereby the measure of status no longer exceeds the threshold.

7. The method according to claim 1 wherein the cumulative number of assigned GBA and DBA time slots is insufficient to accommodate transmission of queued data whereby the measure of status no longer exceeds the threshold, and further including repeating steps (b) to (g).

8. The method according to claim 1 wherein said request for allocation of time slots is transmitted in a GBA time slot or contention timeslot.

9. The method according to claim 1 wherein said base transceiver station determines the availability of time slots in a predetermined number of frames.

10. The method according to claim 1 wherein the same DBA time slots are assigned in successive frames.

11. The method according to claim 1 wherein the maximum number of assignable DBA time slots per frame is determined on the basis of the bandwidth of the said one of said plurality of network interface units.

12. The method according to claim 1 wherein the step of assigning the DBA time slots is further based on the number of GBA time slots assigned to said one of said plurality of network interface units and the number of unassigned DBA time slots.

13. In a time division multiplex access ("TDMA") wireless network wherein network interface units communicate with a base transceiver station by way of transmission of data in a plurality of time slots grouped into a plurality of frames, said time slots including guaranteed bandwidth allocation ("GBA") time slots uniquely assigned to network interface units and dynamic bandwidth allocation ("DBA") time slots variably assignable to said network interface units, a method for allocating said time slots to said network interface units comprising the steps of:

(a) transmitting from an network interface unit to said base transceiver station a request for allocation of time slots, said request including information regarding queue occupancy;

(b) assigning at said base transceiver station to said network interface unit DBA time slots based on queue occupancy, the number of GBA time slots assigned to said network interface unit and the number of unassigned DBA time slots; and (c) transmitting queued data from said network interface unit to said base transceiver station in said assigned GBA and DBA time slots.

* * * * *